United States Patent [19]
Nieves et al.

[11] Patent Number: 6,011,831
[45] Date of Patent: Jan. 4, 2000

[54] NETWORK INTERFACE DEVICE HAVING CAVITIES FOR HOUSING TEST CIRCUITRY

[75] Inventors: Anthony L. Nieves, Shark River Hills; Avraham Tuvy, Oakhurst, both of N.J.

[73] Assignee: Antec Corporation, Duluth, Ga.

[21] Appl. No.: 09/098,029

[22] Filed: Jun. 15, 1998

Related U.S. Application Data

[60] Provisional application No. 60/080,419, Apr. 2, 1998.

[51] Int. Cl.⁷ .............................. H04M 1/24; H04M 1/00
[52] U.S. Cl. ............................. 379/21; 379/399; 379/412
[58] Field of Search ..................................... 379/412, 413, 379/21, 399

[56] References Cited

U.S. PATENT DOCUMENTS

| | | | |
|---|---|---|---|
| 5,207,583 | 5/1993 | Debalko et al. | 379/399 |
| 5,313,519 | 5/1994 | Mickelson et al. | 379/399 |
| 5,333,193 | 7/1994 | Cote et al. | 379/399 |
| 5,363,440 | 11/1994 | Daoud | 379/399 |
| 5,367,569 | 11/1994 | Roach et al. | 379/399 |
| 5,394,466 | 2/1995 | Schneider et al. | 379/399 |
| 5,414,765 | 5/1995 | Lanquist et al. | 379/412 |
| 5,416,837 | 5/1995 | Cote et al. | 379/399 |
| 5,420,920 | 5/1995 | Capper et al. | 379/399 |
| 5,438,619 | 8/1995 | Shannon et al. | 379/399 |
| 5,479,505 | 12/1995 | Butler et al. | 379/399 |
| 5,497,416 | 3/1996 | Butler, III et al. | 379/399 |
| 5,515,435 | 5/1996 | Debalko et al. | 379/399 |
| 5,537,456 | 7/1996 | Bonvallat et al. | 379/399 |
| 5,548,641 | 8/1996 | Butler et al. | 379/412 |
| 5,553,136 | 9/1996 | Meyerhoeffer et al. | 379/399 |
| 5,570,422 | 10/1996 | Napiorkowski et al. | 379/399 |
| 5,583,931 | 12/1996 | Schneider et al. | 379/399 |
| 5,600,717 | 2/1997 | Schneider et al. | 379/399 |
| 5,606,606 | 2/1997 | Schneider et al. | 379/399 |
| 5,623,542 | 4/1997 | Schneider et al. | 379/399 |
| 5,633,926 | 5/1997 | Cannetti | 379/399 |
| 5,657,385 | 8/1997 | Reichle | 379/399 |
| 5,696,820 | 12/1997 | Pelegris et al. | 379/399 |
| 5,703,944 | 12/1997 | Debalko | 379/399 |
| 5,719,934 | 2/1998 | Tuvy | 379/412 |
| 5,724,421 | 3/1998 | Tuvy et al. | 379/399 |
| 5,832,078 | 11/1998 | Tuvy et al. | 379/399 |
| 5,901,220 | 5/1999 | Garver et al. | 379/399 |

*Primary Examiner*—Curtis A. Kuntz
*Assistant Examiner*—Rexford Barnie
*Attorney, Agent, or Firm*—William A. Hartselle

[57] ABSTRACT

A network interface device (NID) including a plurality of cavities beneath the base surface of the NID. Each cavity extends downwardly between the base surface of the NID and the bottom of the NID defined by bosses and extensions extending downwardly from the base surface. Each cavity provides sufficient space for additional electronics, such as a test circuit, to be housed in the NID. The test circuit is housed within the cavity and is electrically connected between the incoming telephone company line and the jack of a line module. The line module is mounted above the test circuit by mating connecting means on the bottom of the line module to cooperative connection means on the base surface. When mounted in this manner, the bottom of the line module is approximately flush with the flat base surface of the NID base, such that mounting the test circuit in the cavity does not cause the line module to extend upwardly any farther from the base surface than would occur if the line module was housed in a conventional NID without a cavity. Therefore, the height of the NID is preferably not affected by the cavities. Also, each cavity preferably does not extend outwardly beyond the footprint of the line module and therefore the cavities do not increase the overall length or width of the NID.

11 Claims, 3 Drawing Sheets

NETWORK INTERFACE DEVICE HAVING CAVITIES FOR HOUSING TEST CIRCUITRY

CROSS-REFERENCE TO RELATED APPLICATION

The present application claims the benefit of priority of U.S. Provisional Patent Application Ser. No. 60/080,419 filed Apr. 2, 1998, entitled "Pocket in NID Base for a Test Circuit".

FIELD OF THE INVENTION

The invention relates generally to a telephone network interface device (NID) and, more particularly, relates to a NID having cavities in the base surface of the NID.

BACKGROUND OF THE INVENTION

Telephone subscribers can own their own equipment and connect such equipment to the incoming telephone line of a telephone service provider at a device typically connected to the side of the subscriber's dwelling or place of business, hereinafter referred to as the "subscriber building." Thus, the device provides a "demarcation point" that is the connection point between the equipment that is accessible to the subscriber (the "subscriber equipment") and equipment that is accessible only to the service provider (the "service provider equipment"). The demarcation point is helpful in fault detection and isolation by easily allowing for the determination of whether a fault exists in the service provider equipment or the subscriber equipment.

Typically, the demarcation point is provided by a telephone network interface device (NID). A conventional NID is housed within a cabinet, typically called a building entrance terminal (BET), having both a service provider compartment and a subscriber compartment for mounting the service provider and subscriber equipment, respectively. These separate compartments are accessible through separate doors or covers. This permits the subscriber to have access to the subscriber equipment to allow the subscriber to test the telephone line at the demarcation point. However, the subscriber does not have access to the service provider compartment.

Typically, NIDs provide a telephone jack for connection to the incoming telephone line from the service provider and a telephone plug for connection to the subscriber telephone line. When the plug is inserted into the jack, a telephone connected to the subscriber telephone line is rendered operable. If the telephone becomes inoperable, the telephone plug can be unplugged from the telephone jack, thus providing a demarcation point to permit the plug of an operating telephone to be plugged into the jack to facilitate the determination of whether the fault exists in the service provider equipment or in the subscriber equipment.

Conventional NIDs are generally box-shaped units that are mounted to the vertical outside surface of the subscriber building. Conventional NIDs have a base surface in the subscriber compartment onto which various equipment is connected. Such equipment includes a line module, which houses the jack into which the plug is inserted to connect the subscriber line to the incoming telephone company line. The line module typically has a bottom, which is connected to the base surface in the subscriber compartment of the NID. In conventional NIDs, the base surface in the subscriber compartment is located above the "bottom" of the NID, i.e., the portion of the NID that contacts the subscriber building. Thus, conventional NIDs do not utilize the space between the base surface and the bottom of the NID.

SUMMARY OF THE INVENTION

The present invention is a network interface device (NID) including a plurality of cavities beneath the base surface of the NID. Each cavity extends downwardly between the base surface of the NID and the bottom of the NID defined by bosses and extensions extending downwardly from the base surface. Each cavity provides sufficient space for additional electronics, such as a test circuit, to be housed in the NID. The test circuit is housed within the cavity and is electrically connected between the incoming telephone company line and a jack of a line module. The line module is mounted above the test circuit by mating connecting means on the bottom of the line module to cooperative connection means on the base surface. When mounted in this manner, the bottom of the line module is approximately flush with the flat base surface of the NID base, such that mounting the test circuit in the cavity does not cause the line module to extend upwardly any farther from the base surface than would occur if the line module was housed in a conventional NID without a cavity. Therefore, the height of the NID is preferably not affected by the cavities. Also, each cavity preferably does not extend outwardly beyond the footprint of the line module and therefore the cavities do not increase the overall length or width of the NID.

DETAILED DESCRIPTION

Figure 1:
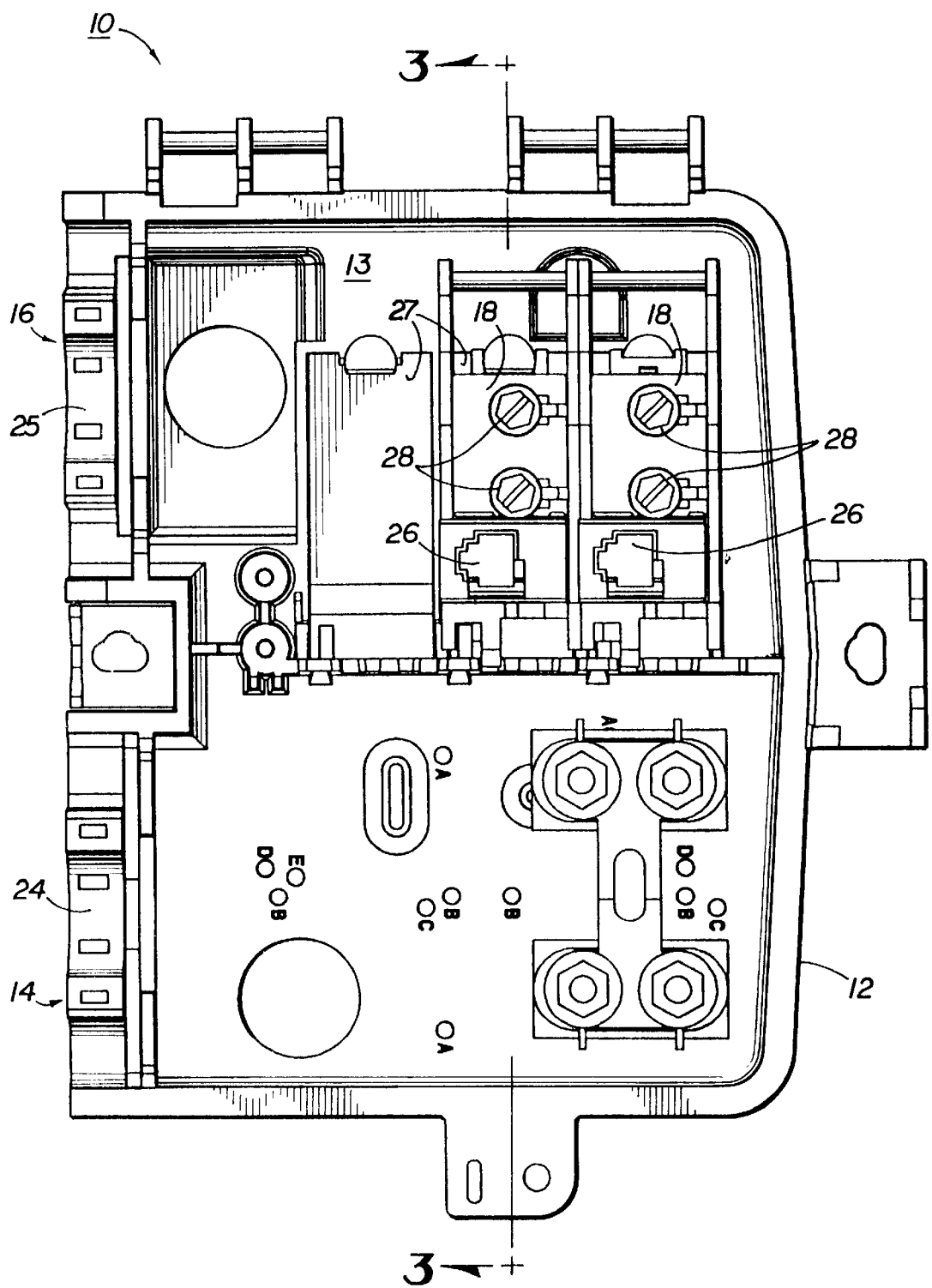
FIG. 1 is a top view of a portion of the base of a NID constructed in accordance with the present invention.
Figure 2:
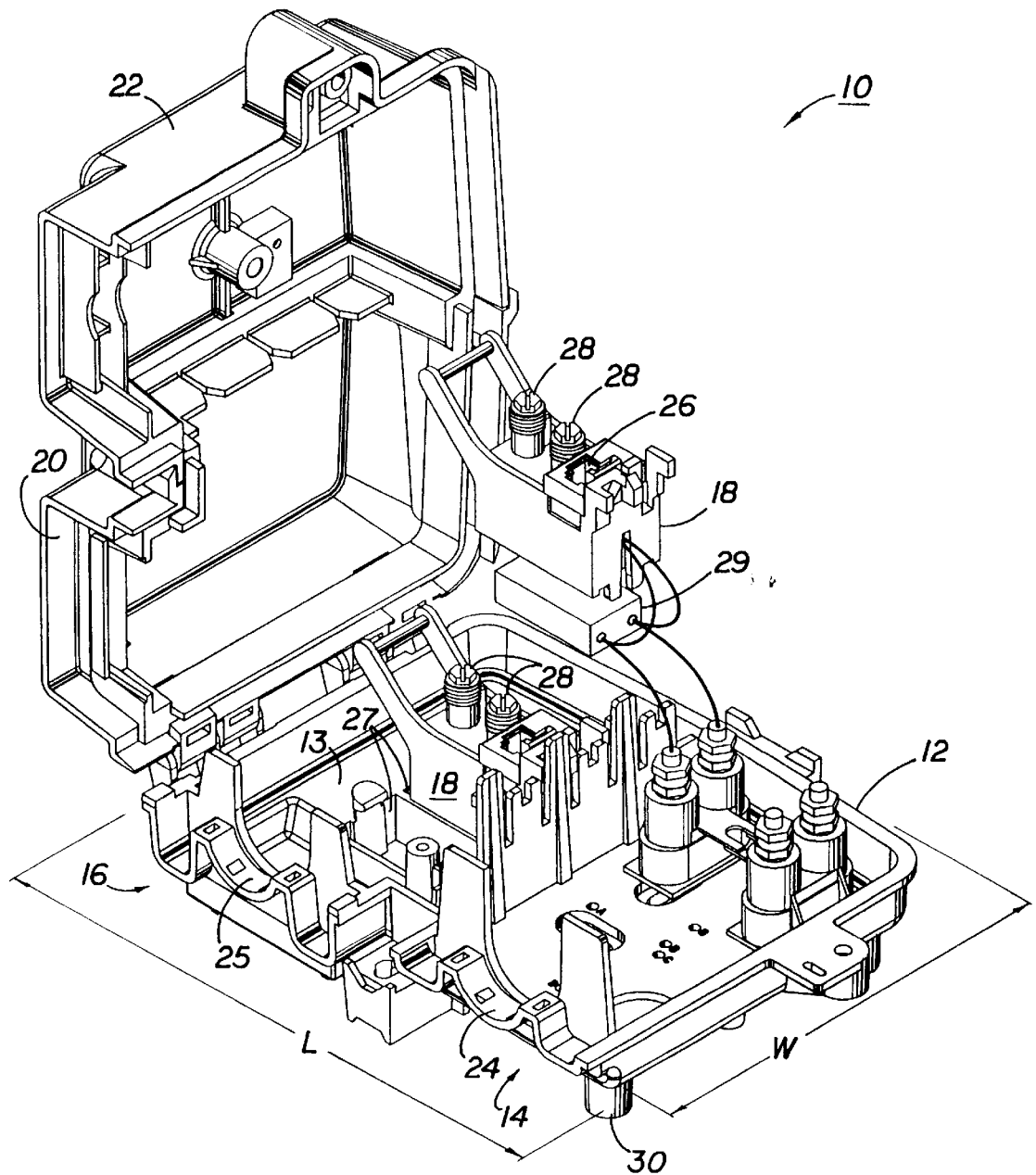
FIG. 2 is a perspective view of a NID, constructed in accordance with the present invention, with the telephone company cover and subscriber cover open.
Figure 3:
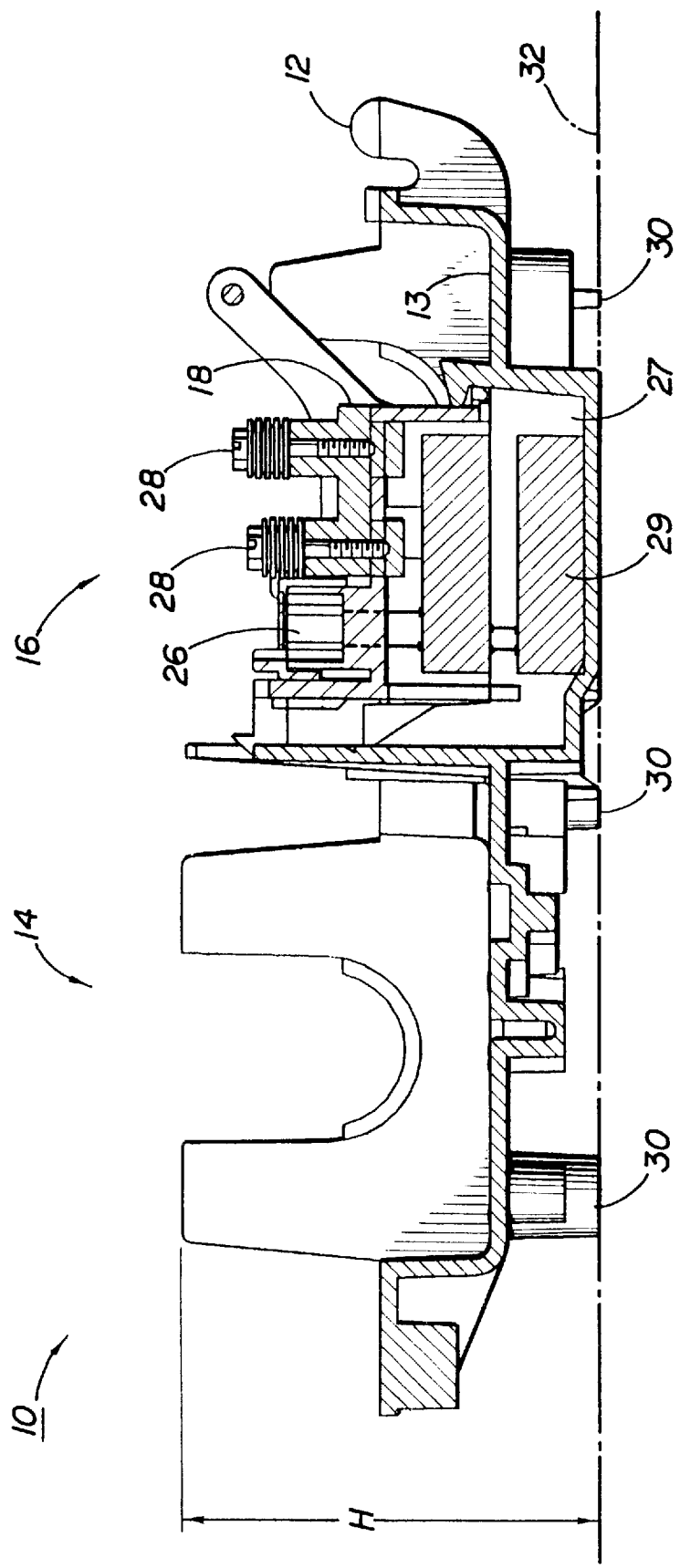
FIG. 3 is a cross-sectional view of the base of a NID, constructed in accordance with the present invention, taken along line 3—3 of FIG. 1.

The present invention, as described herein and with reference to FIGS. 1–3, includes a plurality of cavities in a network interface device (NID). Each cavity provides space for additional electronics, such as a test circuit, to be connected within the NID. Preferably, each test circuit is electrically connected to a line module that is located in the subscriber compartment of the NID. As will be understood from the figures, a test circuit is located in each respective cavity and each respective line module is located above the test circuits and is electrically connected to each respective test circuit. In this manner, the provision of the cavities and the addition of the test circuits to the NID does not increase the length or width, i.e., the "footprint", of the NID and preferably adds no height to the NID.

The present invention is described in connection with a NID, shown generally at 10 in FIGS. 1–3, that provides for the connection of at least one incoming service provider telephone line to at least one subscriber telephone line and provides a demarcation point between service provider equipment and subscriber equipment for selectively allowing both service provider personnel and the subscriber to access the respective equipment.

The NID 10 includes a base 12 which includes a service provider compartment 14 and a subscriber compartment 16. The subscriber compartment includes a base surface 13. Various equipment, including at least one line module 18, is provided within the subscriber compartment 16 and is either mounted on or is connected to the base surface 13. The NID also includes a subscriber cover 20 and a service provider cover 22. The subscriber cover 20, service provider cover 22, and the base 12 are provided with cooperative fastening means for fastening the service provider cover 22 over the service provider compartment 14 and for fastening the subscriber cover 20 over the subscriber compartment 16.

As is well known in the art, incoming telephone company lines enter the NID 10, such as being inserted through a grommeted or otherwise sealed aperture 24. Each line module 18 includes a telephone jack 26 and a pair of subscriber terminals 28. A plug (not shown) is connected via a flexible connector to the subscriber terminals 28 on the line module 18. The subscriber lines running from the subscriber building to the NID are provided through grommeted or otherwise sealed aperture 25. The subscriber lines are connected to the subscriber terminals 28 of the line module. The plug mates with the jack 26 to connect the subscriber line to the incoming service provider line. It should be understood that the demarcation point between the service provider equipment and the subscriber equipment is at the jack 26 of the line module.

In conventional NIDs, the incoming telephone company line is connected to the jack 26 of the line module 18. As shown in FIGS. 1–3, the present invention provides cavities 27 in the base surface 13 of the NID. Preferably, one cavity is provided for each line module housed in the NID. Although the disclosure herein may refer to only a single cavity, it should be understood that the disclosure of such cavity will apply equally to each of a plurality of cavities provided in the NID. Also, it should be understood that the present invention relates to cavities extending downwardly from the base surface of a NID and that the NID, and the components described herein, comprise only one example of a device that may be constructed in accordance with the present invention.

Each cavity 27 provides sufficient space for additional electronics, such as a test circuit 29, to be housed in the subscriber compartment 16 of the NID. The test circuit 29 is housed within the cavity 27 and is electrically connected between the incoming telephone company line and the jack 26 of the line module 18. The line module is mounted above the test circuit by mating connecting means on the bottom of the line module to cooperative connection means on the base surface 13. When mounted in this manner, the bottom of the line module is located above the test circuit and is approximately flush with the flat base surface 13 of the NID base 12. Therefore, mounting the test circuit in the cavity in accordance with the present invention does not cause the line module 18 to extend upwardly any farther from the base surface of the NID than would occur if the line module was housed on the base surface of a conventional NID without a cavity.

Also, providing cavities in the NID base allows additional circuitry to be provided in the NID without increasing the footprint of the NID. As best shown in FIG. 3, the cavity 27 extends downwardly from the base surface 13 of the NID base 12, but preferably does not extend outwardly beyond the footprint of the line module. In this manner, the cavity does not increase the overall length or width of the NID.

It is seen in FIGS. 2 and 3 that the NID has bosses and other extensions 30 that extend downwardly from the base surface 13. When installed on a subscriber building, the bottom of the bosses and extensions contact the wall of the subscriber building. Thus, the bottom of the bosses and extensions effectively define a "bottom" planar surface 32 of the NID, as shown by the dotted line in FIG. 3. Therefore, providing the cavities 27 beneath the base surface 13 utilizes existing space that heretofore has not been utilized between the base surface 13 and the bottom 32 of the NID. Preferably, the depth of the cavities does not extend beyond the bottom of the NID. If desired, the depth of the cavities can be made to extend beyond the bottom 32, which would increase the overall height h of the NID. However, a small increase in the height of the NID caused by the cavities is generally not unacceptable because an increase in the height of the device is generally much more tolerable than an increase in the footprint.

The NID constructed in accordance with the present invention provides such space to house additional circuitry that would not otherwise fit within the NID. Of course, additional space for circuitry could be provided by increasing the length or width of the NID. However, this is disadvantageous compared to the present invention because increasing the length L or width W of the NID would undesirably increase the footprint of the NID. By contrast, the present invention provides space for additional circuitry in the NID without increasing the footprint of the device.

While the preferred embodiments of the invention have been shown and described, it will be obvious to those skilled in the art that various modifications and alterations can be made thereto without departing from the spirit and scope of the invention as defined in the appended claims.

What is claimed is:

1. An enclosure for housing a plurality of line modules therein, each line module for electrically connecting an incoming service provider telephone line to a subscriber telephone line, the enclosure comprising:

a service provider compartment into which the incoming service provider telephone line is introduced;

a subscriber compartment having a base surface at which at least one line module is connected, wherein the connection between said service provider telephone line and said subscriber telephone line is made at said line module;

a bottom defined by a generally planar bottom surface, said bottom surface being a certain distance from said base surface; and a cavity in said base surface in said subscriber compartment extending downwardly from said base surface toward said bottom surface of said enclosure, said cavity being of a dimension to house additional electronics therein, said additional electronics in said cavity being electrically connected to said line module; and wherein said line module is connected to said enclosure at said base surface such that said line module is located above said cavity.

2. The enclosure of claim 1 wherein said additional electronics in said cavity is electrically connected between said service provider telephone line and said line module.

3. The enclosure of claim 1 wherein said line module has a bottom that is approximately flush with said base surface when connected to said base surface.

4. The enclosure of claim 1 wherein said cavity does not extend beyond the bottom surface of said enclosure, such that said cavity does not increase the height of said enclosure.

5. The enclosure of claim 1 wherein said cavity provides space for additional electronics to be housed in said device without increasing the length, width, or height of said enclosure.

6. The enclosure of claim 1 wherein said additional electronics comprises a test circuit.

7. The enclosure of claim 1 wherein said additional electronics is housed entirely within said cavity.

8. The enclosure of claim 1 wherein said bottom of said enclosure is defined, at least in part, by extensions extending downwardly below said base surface, and wherein the bottoms of said extensions define said generally planar bottom surface of said enclosure.

9. The enclosure of claim 1 further comprising a subscriber cover and a service provider cover, wherein the subscriber cover can be opened by both the subscriber and the service provider to provide access to the subscriber compartment, but the service provider cover cannot be opened by the subscriber, thereby preventing the subscriber from accessing the service provider compartment.

10. The enclosure of claim 1 wherein said subscriber compartment includes a plurality of cavities, with one cavity being provided for each respective line module connected therein.

11. The enclosure of claim 1 wherein the length and width of said cavity are approximately the same as the length and width of said line module.

* * * * *